United States Patent [19]

Hussin

[11] 4,156,464
[45] May 29, 1979

[54] COMBINED FRACTURING PROCESS FOR STIMULATION OF OIL AND GAS WELLS

[75] Inventor: Clint Hussin, Calgary, Canada

[73] Assignee: Canadian Fracmaster, Ltd., Canada

[21] Appl. No.: 912,181

[22] Filed: Jun. 5, 1978

[30] Foreign Application Priority Data

Dec. 21, 1977 [CA] Canada .................................. 293588

[51] Int. Cl.² ........................ E21B 43/26; E21B 43/27
[52] U.S. Cl. ........................................ 166/308; 166/307
[58] Field of Search ............... 166/271, 280, 281, 307, 166/308, 309

[56] References Cited

U.S. PATENT DOCUMENTS

| | | | |
|---|---|---|---|
| 2,859,821 | 11/1958 | Trott ..................... | 166/280 |
| 2,965,172 | 12/1960 | Darosa .................. | 166/308 |
| 3,063,499 | 11/1962 | Allen ..................... | 166/280 |
| 3,136,361 | 6/1964 | Marx ..................... | 166/308 |
| 3,195,634 | 7/1965 | Hill ....................... | 166/308 X |
| 3,245,470 | 4/1966 | Henry ................... | 166/280 |
| 3,335,794 | 8/1967 | Bond ..................... | 166/271 |
| 3,572,440 | 3/1971 | Hutchison ............. | 166/307 X |
| 3,937,283 | 2/1976 | Blauer et al. .......... | 166/307 |
| 3,980,136 | 9/1976 | Plummer et al. ...... | 166/280 |
| 4,044,833 | 8/1977 | Volz ...................... | 166/308 X |

Primary Examiner—Stephen J. Novosad
Assistant Examiner—George A. Suchfield
Attorney, Agent, or Firm—Beveridge, De Grandi, Kline & Lunsford

[57] ABSTRACT

The present invention relates to a method of forming fractures and placing proppants therein, which comprises creating a foam having a down-well Mitchell quality of form about 0.53 to 0.99 and passing that foam down the well in admixture with a particulate proppant in an amount of up to four pounds of proppant per gallon of foam, then decreasing the gas volume in said foam, whereby the proppant carrying medium being passed down the well changes from a foam to a liquid. The proppant concentration is decreased as the change occurs from foam to liquid so that the proppant material will not deposit out prematurely in the well. Once liquid flow has been established, the proppant to fluid ratio is gradually increased and the fracture of the formation is continued with liquid and proppant. The liquid is capable of carrying an amount of proppant greater than that which could be carried by the foam, namely an amount up to twelve pounds per U.S. gallon.

17 Claims, 3 Drawing Figures

COMBINED FRACTURING PROCESS FOR STIMULATION OF OIL AND GAS WELLS

This invention relates to the fracturing of formations in deep wells, to increase yields of oil or gas from such wells. More particularly, this invention relates to an improvement in the known "foam fracturing" process.

BACKGROUND OF THE INVENTION

The treatment of wells into oil and gas bearing formations to increase their productivity has long been known in the art. One of the most common methods of increasing productivity is to subject an oil or gas producing formation to a liquid, gas, or foam under a very high pressure. This liquid, gas or foam (known generally as a "fracturing fluid") causes ruptures or fractures in the oil or gas producing formation. A proppant material, such as sand, finely divided gravel, glass beads or the like, is introduced into these fractures, to keep them open. The fracture provides easier access to oil and gas bearing portions of the formation, thereby increasing the productivity of the well.

One of the most successful fracturing techniques has been that known as "foam fracturing". This process is described in U.S. Pat. Nos. 3,937,283 (Blauer and Durborow), and in 3,980,136 (Plummer and Johnson). Briefly, the foam fracturing process involves generating a foam of a desired "Mitchell quality", as described in the Blauer et al patent mentioned above, and pumping this foam down a well to be treated. The composition of the foam is such that the Mitchell foam quality at the bottom of the well will be in a range from about 0.53 to 0.99. Various gases and liquids may be used to create the foam, but the usual foams in the art are made from nitrogen and water, in the presence of a suitable foaming agent, such as for example, sodium dodecyl sulphate. The temperature and pressure at which the foam is pumped into the well is such that it will cause a fracture of the oil or gas bearing formations in the well.

Fracturing caused by the foam fracturing process is very effective, and has many advantages. For example, foam fracturing can be carried out with relatively low powered pumping equipment. Additionally, the foam comes out of the well easily when the pressure is removed from the well head, because the foam expands considerably when pressure is released. This means that the well can be "cleaned up" and returned to production promptly.

Despite its many advantages, there are also disadvantages to the present foam fracturing technique. It is known that the fractures formed by this technique are long and thin. Additionally, the foam cannot support and carry high amounts of proppant, and practical proppant values are of the order of two pounds of sand (when sand is used as a proppant) per gallon of foam of the desired Mitchell quality. Because of the long, thin nature of the fractures, and the relatively low amounts of proppant, fractures formed by a foam fracturing process may not stay open. Additionally, the long, thin fractures are not efficient for delivery of oil or gas from the fractured production zone.

Accordingly, it would be desirable to develop a process which had the advantages of foam fracturing, such as easy clean out and relatively low pumping power requirements, but which provided a fracture which was thicker and filled with more proppant than can be delivered conveniently by the foam fracturing method.

SUMMARY OF THE INVENTION

The present invention relates to a method of forming fractures and placing proppants therein, which comprises creating a foam having a down-well Mitchell quality of from about 0.53 to 0.99 and passing that foam down the well in admixture with a particulate proppant in an amount of up to four pounds of proppant per gallon of foam, then decreasing the gas volume in said foam, whereby the proppant carrying medium being passed down the well changes from a foam to a liquid. The proppant concentration is decreased as the change occurs from foam to liquid so that the proppant material will not deposit out prematurely in the well. Once liquid flow has been established, the proppant to fluid ratio is gradually increased and the fracture of the formation is continued with liquid and proppant. The liquid is capable of carrying an amount of proppant greater than that which could be carried by the foam, namely up to twelve pounds per U.S. gallon.

BRIEF DESCRIPTION OF THE INVENTION

The invention provides a method of using the advantages of foam fracturing, while obviating the disadvantage that foam fracturing cannot place sufficient proppant, and cannot make wide enough fractures for optimum oil or gas recovery after fracture. The results are achieved by depositing foam down a well, with the foam carrying a suitable amount of proppant, as is known in the art of foam fracturing. Then, after a fracture has been initiated, the amount of gas admixed with liquid to form the foam is decreased. This causes the foam to change to an aerated liquid, or if the gas is cut off entirely, to an unaerated liquid. The amount of proppant being introduced into the gas and liquid foaming mixture is also decreased, while the change from foam to liquid is occurring. When the material being passed down the well is a liquid with a desired gas content, then the amount of proppant being introduced into the liquid can be increased to a desired value, all without the danger of "sanding out", or dropping proppant in undesired places in the well.

In an alternate method according to the invention, the foam fracture of the well is terminated, but the well is kept under pressure, and a liquid fracture is then commenced, with a higher ratio of proppant to liquid than was present in the foam.

OBJECT OF THE INVENTION

The object of the invention is to permit the creation of relatively thick fractures, supported by an appreciable amount of proppant, while retaining the advantages of foam fracturing, namely the low pressures required to initiate fracturing, the deep fracture penetration and the ease of "clean out" of the well.

It is believed that the liquid second stage of the fracture forces the foam under increased pressure into the extremities of the fracture, and that, once pressure is released, the foam pushes against the liquid, forcing it out of the fracture, leading to very quick clean up.

DESCRIPTION OF THE PREFERRED EMBODIMENT

Figure 1:
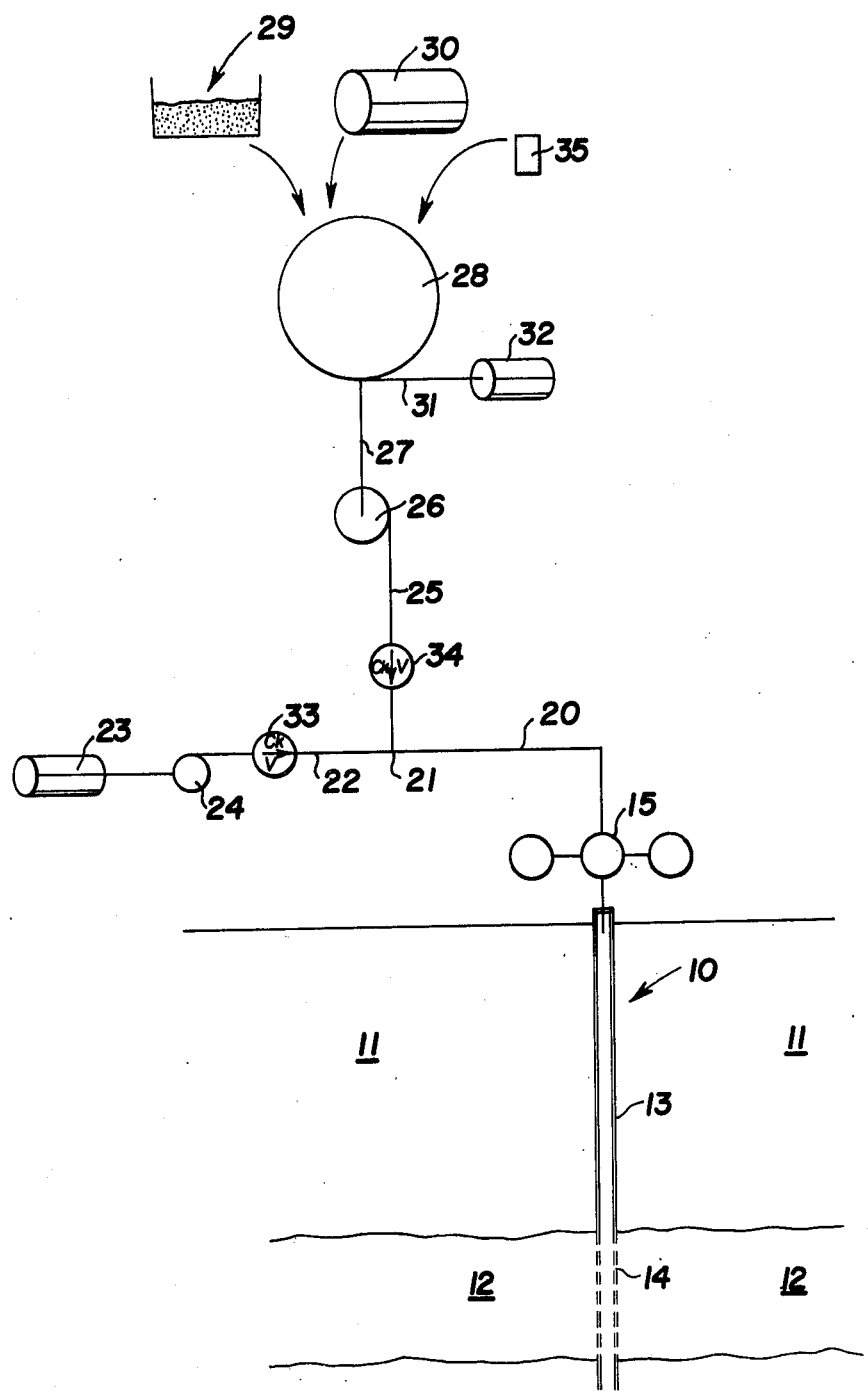
FIG. 1 shows a diagrammatic representation of the equipment used in a fracturing process according to the invention, and the producing stratum of the well prior to fracturing.

Referring to FIG. 1 of the drawing, an oil or gas well 10 is shown passing through over-burden 11 to a producing stratum 12. The well is shown as having a casing 13, which is peforated at the level of the producing stratum with a plurality of holes 14 passing from the well casing into the producing stratum or formation. Such holes are made in a manner well known to the art, as for example by using shots from a steel carrier gun.

The well is closed at its uppermost end with a conventional well-head set of valves known in the art as a well-head "tree" indicated at 15. To this group of valves can be connected suitable lines for pumping materials down the well, as may be required.

In FIG. 1, suitable equipment for the carrying out of the method according to the invention is shown attached to the well-head tree 15. From the tree 15 a line 20 runs to a mixing tee 21. One branch of the mixing tee 21 is connected to a source of gas under pressure. This is illustrated by a line 22 leading to a gas reservoir 23 through pumping equipment 24. The other branch of the tee 21 leads through line 25 to a liquid pump 26, suitably mounted on a truck body. Past the pump 26, a line 27 leads to a mixer 28. Proppant supplies 29 and liquid supplies 30 can be fed to the mixer 28 as desired. Surfactant can be injected into line 27, near its connection with mixer 28, through surfactant inlet 31 connected to surfactant tank 32. Check valves 33 and 34 are provided to prevent back flow into lines 22 and 25 respectively.

According to the operation of the invention, a conventional foam fracturing operation is carried out, then the fracture is continued with liquid or slightly aerated liquid. It is often preferable to begin the operation, prior to the foam fracture, with a conventional well pre-treatment, such as the injection of acid under pressure to remove drilling mud and to attack and roughen the surfaces of the formation where fracture is to be initiated. However, the pre-treatment by acid under pressure is not an integral part of the invention, and can be omitted, depending upon the nature of the formation, and the pressures and foam quality which are to be used during the foam fracturing stages.

If an acid pre-treatment is to be used, a small amount of acid (such as for example, 250 gallons of 15% by weight hydrochloric acid) is passed from a source of acid 35 into the mixer 28, through the line 27 and pump 26 and through line 25 to tee 21. If desired, the acid can be foamed with approximately four times its volume of nitrogen passed from nitrogen storage 23 to pump 24 and line 22, to foam it. The foamed acid is passed through line 20 and well-head 15 down well 10, into holes 14. Pressurized nitrogen from truck 23 follows the acid down the well, to ensure that the acid passes through holes 14. Check valve 34 prevents back flow through line 25, so that the nitrogen which follows the acid down the well does not back flow into this line.

The acid is commonly left in contact with the formation to be fractured for at least 15 minutes. A sufficient pressure is maintained at the well-head 15 to force the acid through holes 14 in the casing and this pressure is usually maintained during the contact period.

After the contact period has expired, a foam fracture is commenced. Liquid (usually water) is fed to the mixing equipment 28, and from there through line 27, pump 26 and line 25 to tee 21. A surfactant (foaming agent) is injected from tank 32 through line 31 into line 27. Simultaneously, the gas used for foaming (usually nitrogen) is introduced from gas reservoir 23 through pump 24 and line 22 to tee 21. Suitable gases for foaming other than nitrogen are known in the art. Carbon dioxide, natural gas, combustion exhaust gas and inert gases can for example be used, but are usually not preferred due to higher cost or lack of availability. Air can be used if the risk of down-well combustion or explosion is not considered to be a problem. The relative rates of flow are adjusted so that a foam of the desired Mitchell quality, within the range of about 0.53 to 0.99 at the level of the producing stratum, is formed. Suitably, a foam quality of 0.75 is used. The calculation of Mitchell quality, and the process of determining the correct admixture of the water and nitrogen to obtain the desired Mitchell quality, is disclosed in U.S. Pat. No. 3,937,283, and will not be repeated here. Enough foam is permitted to enter the well to fill the well completely, and then a further amount of foam (for example, roughly double that required to fill the well) without added proppant is injected into the well. This is conventional in foam fracturing, and is known as a "pad". Injection of foam of the same Mitchell quality then continues, but proppant is admixed in mixing equipment 28 with the water. Suitably, the proppant is sand, as sand is a relatively cheap and effective proppant material but other proppants known to the art, such as, for example, crushed rock crushed glass, glass beads or nut hulls, can be used if desired. The amount of proppant should not exceed 4 pounds per U.S. gallon of foam. Suitably, sand of selected size ranges in the overall size range from 100 to 4 (U.S. standard mesh sizes) is used. The selected ranges within the overall range may be varied as the fracture proceeds. Sand is added at a rate which will cause a mixture in which the foam can carry the sand down the well. For example, about two pounds of sand per gallon of foam is a suitable sand-to-foam ratio. Pumping is continued until a satisfactory foam fracture is created, as is known in the art.

Once a foam fracture of a desired size has been developed, the material being put down the well is changed over from foam to water or "aerated water" (water with a small amount of gas, usually nitrogen or carbon dioxide, in it). If the gas to water ratio were decreased abruptly, without some compensatory action, there could be undesirable dropping of proppant in areas where proppant is not wanted, such as the bottom of the well hole. This is known as "sanding out". One way of avoiding this is to hold the gas to water ratios initially constant, while the proppant to water ratio being introduced into mixer 28 is decreased. When the proppant to water ratio at the mixer 28 is reduced to less than half of the former level, then the rate of gas supply from supply 23 through pump 24 is also reduced, optionally with a simultaneous increase in the rate of pumping of liquid, until the foam collapses. If desired, the gas can be discontinued completely. However, it is usually desirable to have a small amount of gas (for example 300 standard cubic feet of nitrogen per barrel of water) in the water which is supplied to the well. This assists the foam in the driving out of the water during the later clean out.

If desired, an alternative method of changing from foam to water or aerated water can be used while still avoiding "sanding out". In this method, the supply of water and gas forming the foam are both simultaneously cut off, and the well-head valve 15 is closed to maintain pressure. Then, the proppant in the mixer 28 is cleaned out, and pumping through the well-head is resumed, using only water, or water with a small amount (for example 300 standard cubic feet) of gas. Once a flow has been established with this material, then the proppant is added to the mixer 28, to give the desired proppant concentration.

Once the liquid flow (e.g., water or aerated water) has been established, then the proppant amount can be increased considerably. Ideally, a proppant ratio of approximately four to ten pounds per U.S. gallon of water can be used.

Figure 2:
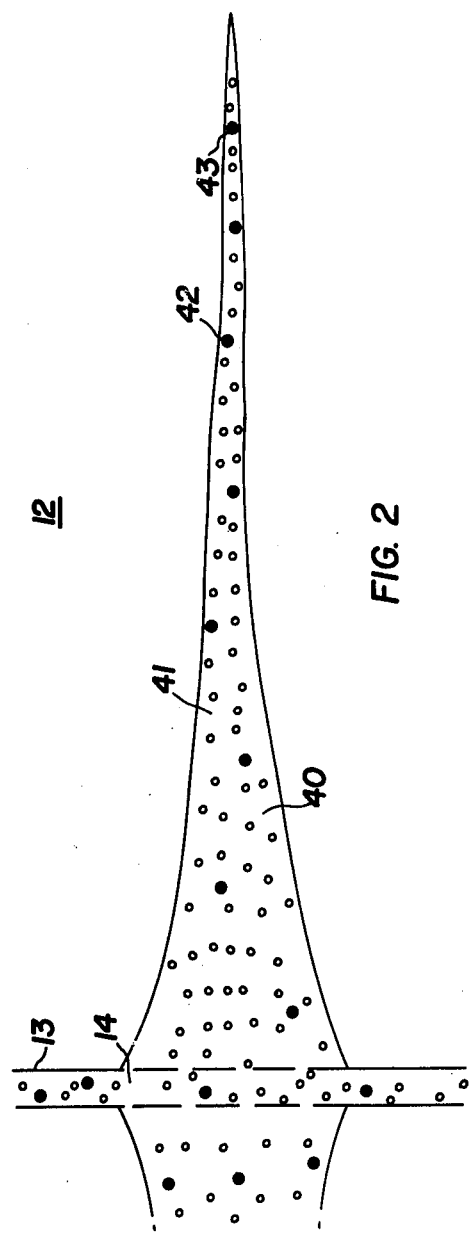
FIG. 2 shows a diagrammatic sketch of the fracture as it is believed to be formed during the first stage (foam) of the fracturing process.

In FIG. 2, the situation which is believed to exist in the well during the first stage of fracture according to the invention is shown in a simplified diagrammatic form. A long, thin fracture or crack 40 has been established, and this is filled with foam 41. This fracture may be oriented horizontally or vertically, according to the nature of the formation. The fracture contains a few proppant particles 42, and some of these have lodged in a position (such as is shown by 43) where they will keep the fracture open.

Figure 3:
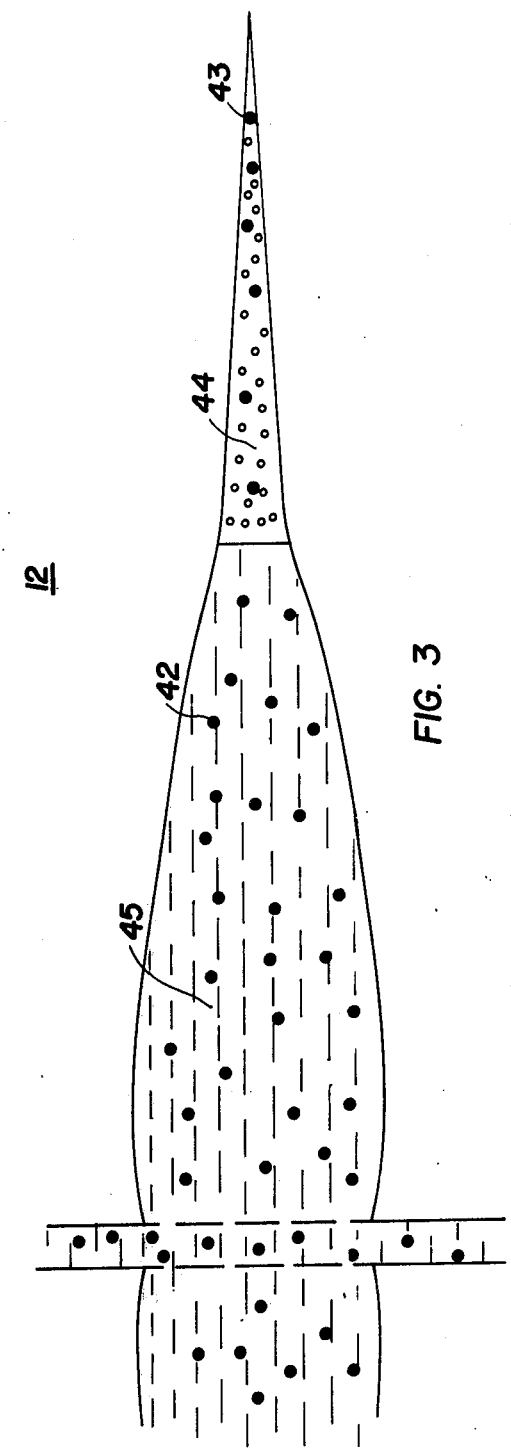
FIG. 3 shows the situation within the fracture after the foam has been replaced by liquid, during the second major stage of the fracture.

FIG. 3 shows the situation after the supply of foam has been discontinued, and the supply of liquid has been commenced. It will be noted that liquid has widened the fracture so that there is now a widened portion 45. Additionally, the liquid contains far more proppant particles 42. The foam has now been pushed by the liquid to the extremity 44 of the crack.

Although FIGS. 2 and 3 are provided to explain what the inventor presently believes to be the down-well result of the process of his invention, it should be emphasized that direct observation of down-well conditions cannot be made in the present state of technology. It is possible that mechanisms of fracture propagation other than the one described may occur as a result of the fracturing process of the invention, either in addition to or in lieu of the mechanism described.

Once the fracture has continued to a desired size, (as determined by the amount of fluids passed down the well and the pressure at the well-head) then the liquid supply is discontinued. The fracture is then sealed off by closing the valves on the well-head tree 15. Suitably, the fracture is sealed off for approximately one hour. This is known as "healing" and permits the weight of the overburden 11 to press down on the fracture and cause the fracture to assume a stable shape. When the healing period is finished, the valves 15 are vented, and water and foam begin to pour from the fracture. The presence of the pressurized foam (44 in FIG. 3) forces substantially all of the water out of the fracture and the foam follows the water. After a period of foam and water recovery, the well begins to produce. It is found that production levels are much higher than the levels prior to the fracturing technique.

If further improved results are required, it is possible to repeat the cycle of a foam fracture, followed by a liquid fracture as has been described.

It is also within the scope of the invention to include well treatment materials, (i.e., reagents capable of reacting with the well formation), such as potassium chloride (to reduce the swelling of clay in the region of the fracture), carbon dioxide, acids and other known materials in the water used in both the foam and liquid fracturing stages, if desired. It is particularly desirable, in treating acid soluble formations such as limestones and dolomites, to use an aqueous solution of an acid, capable of reacting with the formation, such as hydrochloric acid, acetic acid or formic acid as the aqueous portion of the foam and as the liquid for the liquid fracturing stage. Alternatively, this aqueous acid can be used in only one of the stages of the process (preferably the liquid fracturing stage) if desired.

Although it is preferred that the foam be formed of nitrogen in water, the other known gases used in foam fracturing such as carbon dioxide, natural gas, combustion exhaust gas and, (where explosion is not a hazard) air, can be used instead. Although it is not preferred, the water can be replaced by a liquid hydrocarbon fraction, or a water-methanol mixture having a methanol concentration of up to 60% by volume.

EXAMPLE I

A fracture program was carried out on a well in the Milk River formation in the Matziwin area of Alberta using apparatus as shown in FIG. 1. Initially, the well was taken off stream and pressure in the well casing was reduced to atmospheric. The well casing was perforated at the level of the desired formation with 38 shots from a 3 and ⅛ inch steel carrier gun, which one shot being given per foot of casing in the desired area. 250 gallons (all gallons mentioned are U.S. gallons) of 15% by weight hydrochloric acid were foamed with a foaming agent and nitrogen, to a Mitchell quality of 0.75 at the level of the formation, and were passed down the casing. The acid was flushed through the perforations with nitrogen. Then, the well was pressurized with nitrogen to 1,600 psi. Once the acid had passed through the perforations, pressure in the well decreased to approximately 1,200 psi. The well was then sealed and remained at 1,200 psi for approximately 29 minutes.

A foam fracturing treatment was commenced. The water used to form in the foam contained 3% by weight of potassium chloride, as a water-treating agent to prevent clay swelling in the formation. Ten gallons of a foaming agent solution per thousand gallons of water were added to the water at the discharge of the blender. The foaming agent solution was premixed by combining 40% by volume of sodium lauryl sulfate into a 50/50 volume/volume mixture of methanol and water. This foaming agent is a conventional one well known in the art. Other foaming agents known in the foam fracturing art could be used instead. The well was then filled with 24 barrels (a barrel is 42 U.S. gallons) of foam formed of nitrogen in water with a foaming agent as described above. The foam was maintained at a calculated Mitchell quality, at the level of the formation being treated, of approximately 0.75. The same Mitchell quality was maintained for all foam used.

A "pad" of 48 barrels of foam was then forced into the well. Pressure at the well-head rose to approximately 2,400 psi during the placing of the "pad". Foam with sand (as proppant) admixed was then passed into the well. Sand of 10/20 mesh was used, at a concentration of approximately 1½ pounds of sand per gallon of foam. This concentration was achieved by a sand addition of 6 pounds per gallon of liquid in the mixer, and subsequent blending with nitrogen at a T-junction shown as 21 in the drawings to obtain a nitrogen/water ratio of 4:1, in order to achieve the desired foam quality. Subsequently, after about 80 barrels of foam at this concentration had been pumped into the well, the sand concentration was increased to 2 pounds of sand per gallon of foam (i.e., an addition of 8 pounds of sand per gallon of liquid in the mixer) and a further 60 barrels of foam were passed into the well. Pressure at this time remained at 2,400±100 psi at the well-head. The sand mesh was then changed from 10/20 to 8/12 mesh, but the sand concentration was left at approximately 2 pounds per gallon of foam. 180 barrels of foam were passed into the well with this concentration of sand. Then the amount of nitrogen being pumped by pump 24 was descreased over a period of about one minute, and the amount of sand being placed in the blender was abruptly decreased from eight pounds per gallon of liquid in the blender to three pounds per gallon of liquid in the blender. Simultaneously, the rate of foaming agent solution addition to the blender was decreased from 10 gallons per thousand gallons of water to 2 gallons per thousand gallons of water. The rate of nitrogen was decreased until the nitrogen addition at the mixing tee to the water-sand mixture was 300 standard cubic feet (a standard cubic foot is the volume at a given temperature and pressure which would correspond with 1 cubic foot at 1 atmosphere and 60° F.) per barrel of water/sand mixture. This amount of nitrogen is an amount commonly used in forming lightly aerated water for use in fracturing, and water with this amount of nitrogen will hereinafter be called "nitrified water". The amount of sand per gallon of water being passed down the well increased during this period from approximately 3 pounds per gallon to approximately 4 pounds per gallon. The amount of nitrogen was held constant at 300 standard cubic feet per barrel of water. The pressure at the well surface decreased from 2,000 psi to approximately 1,500 psi, and then increased again to approximately 1,700±50 psi. Sand volume was increased slowly to approximately 6 pounds of sand per gallon of water, and another 22 barrels of nitrified water were passed down the well. Following this, sand addition was discontinued and a further 24 barrels of nitrified water (without sand) were passed down the well to displace the sand to bottom. Pumping was then stopped and pressure in the well dropped to approximately 1,000 psi. The well was sealed and allowed to remain sealed for one hour, after which it was vented to atmospheric pressure. Water and nitrogen was allowed to flow out and within 24 hours, the flow of water and nitrogen was supplanted by natural gas. Approximately 28 hours after venting to atmosphere the well was placed on production stream.

EXAMPLE II

A second well in the Milk River formation in the Matziwin area of Alberta was treated according to the invention using apparatus as shown in FIG. 1. Initially, the well was taken off stream and pressure in the well casing was reduced to atmospheric pressure. The casing was perforated at the desired formation depth with a three and one-eighth inch steel carrier gun at one shot per foot, for a total of 33 shots. 250 gallons of 15% by weight hydrochloric acid were foamed with a foaming agent and nitrogen to develop a foam of 0.75 Mitchell quality, and this was passed down the well at 16 barrels per minute for 1½ minutes, achieving a pressure of 1,500 psi at the well-head. The acid was allowed to remain in the well for 20 minutes. The well was then filled with 24 barrels of 0.75 Mitchell quality foam, and a pad of 48 barrels of foam was passed down the well. The water used to develop foam in the example contained 3% by weight of potassium chloride, a known water-treating agent. Ten gallons of a foaming agent solution per thousand gallons of water were added at the discharge of the blender by means of the line shown as 32 in FIG. 1. The foaming agent solution was premixed by combining 40% by volume of sodium lauryl sulfate into a 50/50 volume/volume mixture of methanol and water. Then approximately 140 barrels of foam containing a total of 10,000 pounds of 10/20 sand were passed down the well, at a sand ratio gradually increasing from 1.7 pounds per gallon of foam to 2.0 pounds per gallon, and a flow rate of 40 barrels per minute. The sand size was changed to 8/12 mesh sand, and 15,000 pounds of sand in 180 barrels of foam (approximately 2.1 pounds per gallon) were passed down the well at a rate of 34 gallons per minute. The amount of sand being placed into the blender was decreased, and the nitrogen ratio was decreased to 300 standard cubic feet so that foam was no longer formed, and the amount of foaming agent solution was reduced to two gallons per thousand gallons of water. The result of these changes was to collapse the foam and cause the material flowing down the well to change to water aerated with nitrogen, commonly known as "nitrified water".

After the material passing down the well was completely nitrified water, the sand concentration was increased gradually to six pounds of sand per gallon of nitrified water, and the flow rate was raised to 58 barrels of nitrified water and sand per minute. The pressure at the well-head rose to 1,600 200 psi, then increased to 1,900 psi, at which the treatment was terminated. The well was then flushed with 24 barrels of nitrified water, and shut in for one hour. The well was then vented to atmosphere, and left flowing overnight. Twenty-three hours after the fracture had been completed, the well flowed only hydrocarbon, and was put back on stream as a producing well.

EXAMPLE III

The advantage of the method according to the invention was demonstrated by the carrying out of fractures on two shallow gas wells in the Medicine Hat area of Alberta. Each of these wells had similar reservoir characteristics, and they were within close proximity of each other. Prior to the fractures, both wells had essentially no production.

The first well was fractured using a conventional aerated water technique, with the water aerated with carbon dioxide. Fifty thousand pounds of 10/20 mesh sand were passed down the well in aerated water. After the well had been fractured, and had cleaned out so that it flowed only hydrocarbon, production was 85 mcf per day. Over a three-month period, this production decreased to 50 mcf per day.

The second well was treated according to the invention, using the same technique as described in Example I. Thirty thousand pounds of 10/20 mesh sand were passed down the well in foam of 0.75 Mitchell quality at a sand ratio of 1.5 pounds per gallon, with the foam being made with nitrogen as described in Example I, using the same foaming agent as in Example I. The foam was passed into the well at the rate of 8 barrels per minute. Then, the material being passed down the well was changed from foam to aerated water, and 30,000 pounds of 8/12 mesh sand were passed down the well in water at a sand ratio of 8 pounds per gallon, and a rate of 40 barrels per minute. The water was aerated with nitrogen at 400 standard cubic feet per barrel.

After the well had cleaned out, and produced only hydrocarbon (approximately 22 hours after the completion of the fracture) the gas production was 100 mcf per day. This production remained essentially constant for a three-month period.

It will be noted that the process of the invention gave much better results than the prior gasified water technique, in both short and long term, in these two analogous wells.

It will be obvious to one skilled in the art to make minor modifications of the preferred embodiment shown and described above, without departing from the scope of the invention, which is as set out in the appended claims.

What is claimed is:

1. A process of fracturing a well to increase the rate of hydrocarbon yield thereof, which comprises;
    forming a foam of a Mitchell quality at the level of the formation to be treated of from 0.53 to 0.99;
    performing a foam fracture treatment on the well with said foam, said foam carrying in suspension during at least part of the fracture treatment, a proppant
    allowing the foam to remain the well under pressure;
    prior to allowing the foam to escape, introducing into the well a liquid fracturing agent under pressure, said liquid fracturing agent being introduced in a volume greater than the volume of the well, whereby to pressurize the foam and increase the volume of the fracture in the formation, said liquid fracturing agent including, for at least a portion of the time during which it is introduced, from one to twelve pounds of proppant per U.S. gallon of liquid.

2. A process as claimed in claim 1, wherein the gas component of said foam consists of a gas selected from the group consisting of nitrogen, carbon dioxide, air, natural gas, and combustion exhaust gas, and non-explosive mixtures from such gases.

3. A process according to claim 2, wherein the proppant material is selected from the group consisting of sand, crushed rock, crushed glass, glass beads and nut hulls.

4. A process as claimed in claim 1, wherein the liquid component of said foam comprises at least one liquid selected from the group consisting of water and a liquid hydrocarbon fraction.

5. The method of claim 1, wherein the liquid component of the foam is water.

6. A process as claimed in claim 1, in which the foam is formed of nitrogen, a conventional foaming agent, and water.

7. A process as claimed in claim 6, in which the water in said foam was included therein a reagent capable of reacting with the well formation.

8. A process as claimed in claim 6, in which the liquid fracturing agent is water.

9. A process as claimed in claim 8, in which said water which is present as the liquid fracturing agent includes a conventional foaming agent and sufficient gas to lightly aerate the water without forming a foam.

10. A process as claimed in claim 9, in which the gas is nitrogen.

11. A process as claimed in claim 10, in which the nitrogen which is present to aerate the water is present in an amount of up to 300 standard cubic feet.

12. A process as claimed in claim 11, in which the foaming agent is sodium lauryl sulfate.

13. A method as claimed in claim 1, wherein the liquid component of said foam is water having a solution therein an acid capable of reacting with said formation.

14. A process as claimed in claim 13, in which the liquid fracturing agent is an aqueous solution of an acid capable of reacting with the formation.

15. A process as claimed in claim 14, in which the acid present in the liquid fracturing agent is selected from the group consisting of hydrochloric, acetic and formic acids.

16. A process as claimed in claim 1, in which the amount of proppant present in the foam does not exceed four pounds of proppant per U.S. gallon of foam.

17. A process as claimed in claim 1, in which the liquid component is a mixture of water and methanol.

* * * * *